(12) United States Patent
Burkhard

(10) Patent No.: US 9,958,344 B2
(45) Date of Patent: May 1, 2018

(54) FORCE-TRANSMITTING MECHANISM WITH A SEPARATE LEVER ARM EXTENDING TO A POSITION SENSOR

(71) Applicant: Mettler-Toledo GmbH, Greifensee (CH)

(72) Inventor: Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days. days.

(21) Appl. No.: 15/423,107

(22) Filed: Feb. 2, 2017

(65) Prior Publication Data

US 2017/0241846 A1 Aug. 24, 2017

(30) Foreign Application Priority Data

Feb. 19, 2016 (EP) ..................... 16156554

(51) Int. Cl.
*G01L 1/00* (2006.01)
*G01L 1/20* (2006.01)
(Continued)

(52) U.S. Cl.
CPC ............ *G01L 1/20* (2013.01); *G01D 5/26* (2013.01); *G01G 7/02* (2013.01); *G01G 21/244* (2013.01)

(58) Field of Classification Search
CPC  G01G 23/48; G01G 7/04; G01G 7/02; G01G 21/244; G01L 1/20; G01D 5/26
(Continued)

(56) References Cited

U.S. PATENT DOCUMENTS 4,043,415 A * 8/1977 Luchinger ................ G01G 7/04
177/168
4,245,711 A 1/1981 Kunz
(Continued)

FOREIGN PATENT DOCUMENTS

DE 4137919 C1 2/1993
DE 19621375 A1 12/1997
DE 3743073 A1 7/1998

*Primary Examiner* — Max Noori
(74) *Attorney, Agent, or Firm* — Standley Law Group LLP

(57) ABSTRACT

The force-transmitting mechanism (400) includes a parallel-motion guide mechanism with a movable parallel leg (440), a stationary parallel leg, and at least two parallel-guiding members (450), wherein the parallel legs and the parallel-guiding members are connected to each other by flexure pivots and the movable parallel leg is constrained to the stationary parallel leg in guided mobility by the parallel-guiding members. The force-transmitting mechanism further includes a force-transmitting lever (480) which is pivotally supported on a fulcrum pivot (490) arranged on the stationary parallel leg, with a first lever arm (481) having a force-transmitting connection to the movable parallel leg by way of a coupling member (470), and a second lever arm (482) to which a measurement transducer (410) can be attached through a force-transmitting connection. The second lever arm includes a first partial lever arm (482A) and a second partial lever arm (482B), wherein the first partial lever arm is designed to receive the compensation force generated by the measurement transducer, and the second partial lever arm is designed for the detection of a displacement of the pivotally supported force-transmitting lever relative to a null reference of a position sensor (420).

19 Claims, 6 Drawing Sheets

(51) Int. Cl.
   *G01D 5/26*    (2006.01)
   *G01G 7/02*    (2006.01)
   *G01G 21/24*   (2006.01)

(58) Field of Classification Search
   USPC .............................. 73/862.68; 177/210 EM
   See application file for complete search history.

(56) References Cited

U.S. PATENT DOCUMENTS

| | | | |
|---|---|---|---|
| 4,938,301 A | | 7/1990 | Stadler et al. |
| 4,964,478 A | | 10/1990 | Stadler et al. |
| 4,997,051 A | * | 3/1991 | Maaz ...................... G01G 7/02 |
| | | | 177/126 |
| 5,315,073 A | | 5/1994 | Ast et al. |
| 6,365,847 B1 | * | 4/2002 | Muller .................... G01G 7/02 |
| | | | 177/210 EM |
| 6,378,379 B1 | | 4/2002 | Emery et al. |
| 9,086,315 B2 | | 7/2015 | Metzger et al. |
| 2006/0096790 A1 | | 5/2006 | Muehlich et al. |
| 2011/0147099 A1 | * | 6/2011 | Burkhard ............... G01G 21/00 |
| | | | 177/246 |
| 2012/0312069 A1 | * | 12/2012 | Burkhard ............. G01G 23/012 |
| | | | 73/1.13 |
| 2013/0168163 A1 | * | 7/2013 | Gottfriedsen ........... G01G 3/00 |
| | | | 177/201 |
| 2013/0233045 A1 | * | 9/2013 | Burkhard ................ G01G 7/04 |
| | | | 73/1.13 |
| 2014/0020960 A1 | * | 1/2014 | Metzger .................. G01G 1/18 |
| | | | 177/1 |
| 2016/0033320 A1 | | 2/2016 | Graf |

* cited by examiner

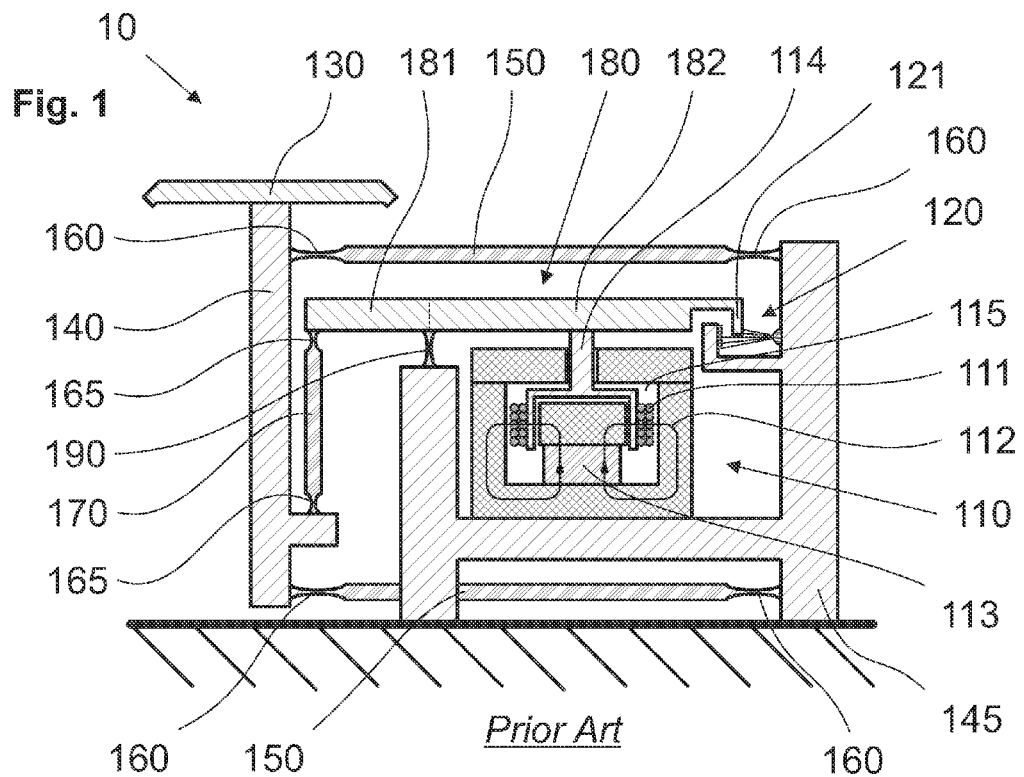
Fig. 1 *Prior Art*
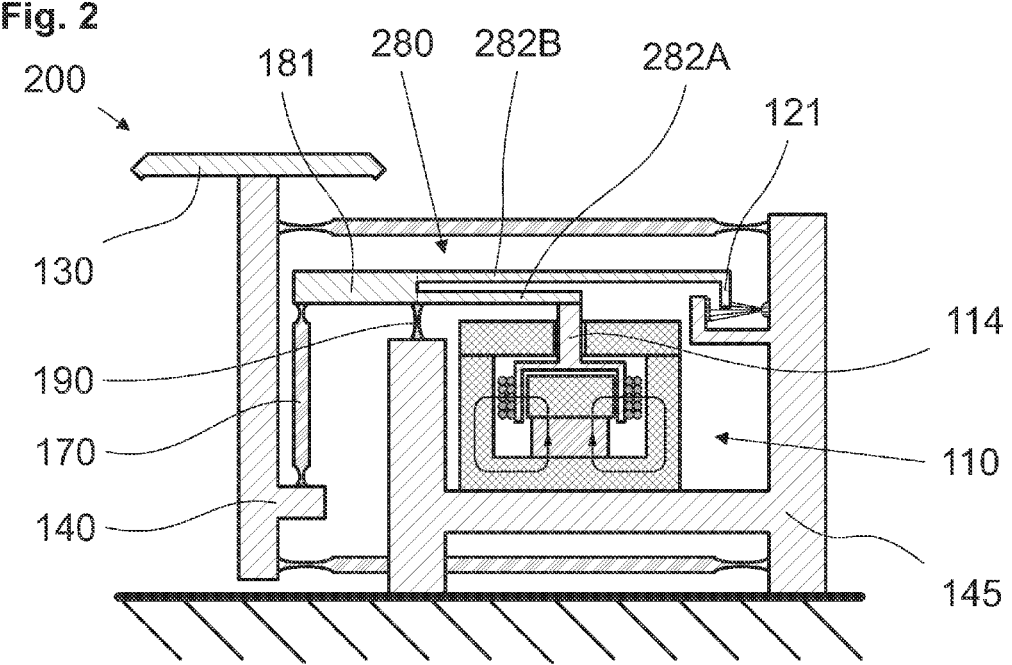
Fig. 2

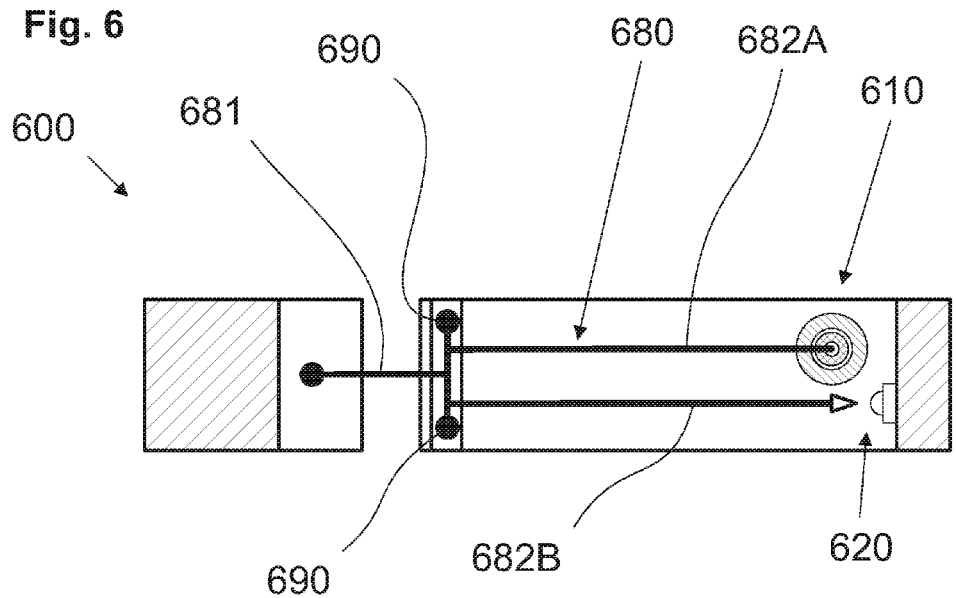
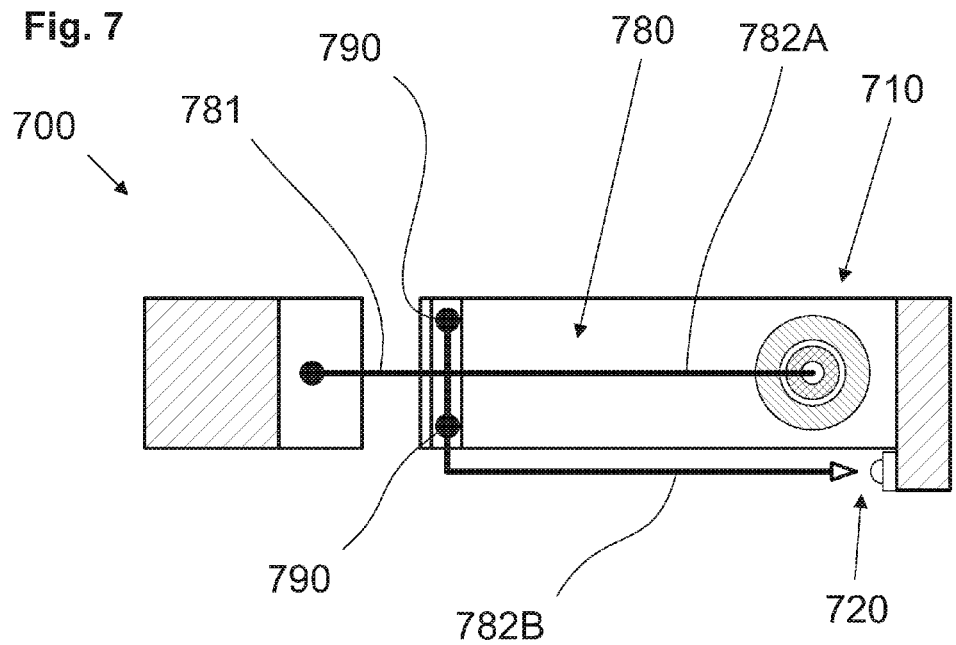

FORCE-TRANSMITTING MECHANISM WITH A SEPARATE LEVER ARM EXTENDING TO A POSITION SENSOR

CROSS-REFERENCE TO RELATED APPLICATIONS

This application is entitled to benefit of a right of priority from European Patent Application No. 16156554.4, filed on 19 Feb. 2016. The content of that application is incorporated by reference as if fully recited herein.

TECHNICAL FIELD

The invention relates to a force-transmitting mechanism for a force-measuring device based on the principle of electromagnetic force compensation, and it further relates to a gravimetric measuring instrument with a force-measuring device and a method of regulating the electrical current flowing through a force compensation coil of a force-measuring device that is based on the principle of electromagnetic force compensation.

BACKGROUND ART

The principle of electromagnetic force compensation has a wide field of applications in the most diverse kinds of weighing scales and balances that are employed in commerce, in industry, and in laboratories. This principle has the particular strength that weighing instruments of enormous measurement accuracy can be realized with it. For example, an analytical balance functioning according to the principle of electromagnetic force compensation offers the capability to measure a weighing load of 100 g with a measurement resolution of 0.01 mg, i.e. with a precision of one part in ten million.

A gravimetric force-measuring device of the generic type to which the present invention relates has a stationary base part, a load receiver constrained to the base part for guided mobility and serving to receive the weight force of a weighing load, a permanent magnet assembly with an air gap fastened to the base part, a coil that is movable in the air gap and carries a compensation current, as well as a force-transmitting mechanism that connects the load receiver to the coil. An optoelectronic position sensor, whose sensor signal corresponds to the amount of deflection by which the interconnected moving parts of the balance mechanism are displaced out of a null position as a result of placing a load on the load receiver, includes typically a light emitter and a light receiver which are arranged on the base part facing each other across an interstice, as well as a shutter vane that cuts through the interstice and participates in the deflection of the moving parts.

The signal of the position sensor is sent to a controller which, in response, regulates the compensation current in such a way that the electromagnetic force between the coil and the permanent magnet returns the shutter vane and the connected movable parts of the balance to the null position. In other words, the function of the controller is to establish equilibrium between the electromagnetic compensation force and the weighing load. As the magnitude of the coil current and the force generated by it are proportionate to each other, the weight of a weighing load placed on the load receiver can be determined by measuring the coil current.

A balance operating in accordance with the principle of electromagnetic force compensation of the foregoing description is shown in DE 3 743 073 A1. The balance consists of a support console that stands in fixed connection to the balance housing and, by way of two swivel-jointed guide members, holds a load receiver with vertically guided mobility. On top, the load receiver carries the weighing pan which serves to receive the weighing object. A force corresponding to the mass of the weighing object is transmitted from the load receiver by way of a coupling element to the shorter lever arm of the reduction lever. The reduction lever is supported on the support console by means of two fulcrum flexures. A coil is connected to the longer lever arm of the reduction lever. The coil floats in the air gap of a permanent magnet system and generates the load-dependent counteracting force. The magnitude of the current flowing through the coil is regulated in the known manner by way of the optical position sensor and a servo amplifier in such a way that equilibrium is maintained between the weight of the weighing load and the electromagnetically generated counterforce. The optical sensor consists of the radiation emitter, the radiation receiver and the slotted aperture vane. The radiation emitter and the radiation receiver are fastened to the cover of the permanent magnet assembly, while the slotted aperture vane is fastened to the reduction lever. In this arrangement, the rearward end of the reduction lever, the coil and the slotted aperture vane according to the description of DE 3 743 073 A1 form a compact unit of high geometric stability.

A weighing system for a top-loading balance is shown in DE 103 26 699 B3. The weighing system includes a reduction lever split into two partial levers. The coupling element and the flexure fulcrum (in this case called bending fulcrum) of the reduction lever are likewise divided into two parts and are arranged laterally of the load receiver. The two partial levers are joined at the end, specifically at the longer lever arms, by a transverse connector which carries a slotted aperture vane and a coil mount for the attachment of the coil. This arrangement results in a very compact weighing system.

An optical position sensor is described in EP 2 607 866 A1. The main requirement that must be met by a position sensor of an electromagnetic compensation balance is the condition that the null position, i.e. the position of the shutter vane relative to the base part at which the transition of the sensor signal between negative and positive values takes place has to be maintained with the highest degree of accuracy and reproducibility. Furthermore, the sensor signal should be, as much as possible, a linear function of the deflection of the sensor vane. These requirements have to be satisfied in particular within a prescribed range of atmospheric temperature and humidity.

Within the subject area outlined above, the present invention is focused on the design of the force-transmitting mechanism and on how the optoelectronic sensor and the measurement transducer (for example a coil) are attached to the force-transmitting mechanism.

With the development of more and more powerful measurement transducers that are used in combination with force-transmitting mechanisms it becomes necessary to adapt the force-transmitting mechanisms to the increased forces which cause higher bending moments in the force-transmitting lever. If this factor is not considered in the design, the forces acting on the force-transmitting lever—on one side the weight force of the weighing load and on the other side the compensation force of the measurement transducer—can cause a bending deformation of the force-transmitting lever. Due to the inelastic behavior of the material of the force-transmitting lever, a downward displacement of the load receiver (i.e. a position shift in the direction of gravity) can occur over time, causing a load-related drift of the weighing result. This downward displacement of the load receiver further can further lead to an increase of the restoring forces of all flexure pivots (thin material connections), which can be viewed as springs that are characterized by an elastic spring rate and are subjected to a larger deflection as a consequence of the displacement. Over the long term, the increase of the restoring forces can likewise have an unknown effect on the measurement result, as the calculation parameter values that were stored in the processor unit for a specific operating point are no longer valid. These effects can be partially compensated through appropriate software measures. However, such a method of compensation relies on parameter values obtained from theoretical models and from experience and is not adequate for force-measuring devices of high precision.

In common state-of-the-art designs of force-measuring devices such as for example in WO 2014 169 981 A1, U.S. Pat. Nos. 4,938,301, 5,315,073, 4,245,711 or, as mentioned above, in DE 3 743 073 A1, the position-sensing function is performed by means of the shutter vane which is attached to the force-transmitting lever, i.e. the same lever to which the coil is attached. This has the advantage of simplicity of construction, as the same lever is being used. However, with the possible bending deformation of the force-transmitting lever that has been mentioned above, the position-sensing function is also compromised.

One possibility how the bending deformation could be counteracted is to improve the design of the force-transmitting mechanism in such a way that the force-transmitting lever will withstand the increased forces. However, the lever should on the one hand be as light as possible so that its mass inertia does not slow down the oscillatory return to the null position, but on the other hand the bending deformation of the lever should be minimized in view of the aforementioned inelastic behavior. Furthermore, the preferred production method is pressure die casting because of its low procurement- and manufacturing cost, but the inelastic properties of the finished parts are very unfavorable.

The coil is in most cases attached to the end of the longer lever arm of the force-transmitting lever. The corresponding permanent magnet core is arranged in the center of a cup-shaped cylindrical mantle whose function is to channel and to conduct the magnetic field as well as to contain the stray field and thereby to prevent interference with the adjacent electronic circuits, i.e. to shield the electronics from the magnetic field. Conversely, this shielding also reduces an unwanted influence of outside factors on the magnetic field of the permanent magnet. Openings in the mantle are necessary in order to allow the force-transmitting lever to enter the inside of the mantle, so that the coil can be held in the magnetic field. The openings in the mantle should be kept as small as possible, because otherwise the magnetic field could propagate to the outside of the mantle, or the force-measuring device could be adversely affected by parasitic extraneous fields. Any inhomogeneous zone in the system composed of the permanent magnet and the coil has a detrimental effect on the desired linearity of the force-measuring device. A switched arrangement in which the permanent magnet is attached to the force-transmitting lever and the coil is attached to the stationary leg of the parallel-motion guide mechanism is fraught with the same problems that have been discussed above.

The present invention therefore has the objective to provide a force-transmitting mechanism which is compatible with the installation of more powerful measurement transducers and which overcomes the drawbacks of the state of the art. In addition, the influence of extraneous fields acting on the force-measuring device from the outside should be minimized.

SUMMARY

According to the invention, this task is solved by a force-transmitting mechanism for a force-measuring device based on the principle of electromagnetic force compensation in accordance with the accompanying claims. The force-transmitting mechanism includes a parallel-motion guide arrangement with a movable parallel leg, a stationary parallel leg, and at least two parallel-guiding members, wherein the parallel legs and the parallel-guiding members are connected to each other by flexure pivots, and wherein the parallel-guiding members constrain the movable parallel leg in guided mobility relative to the stationary parallel leg. The force-transmitting mechanism further includes a force-transmitting lever that is pivotally supported by a fulcrum which is arranged on the stationary parallel leg. The force-transmitting lever has a first lever arm with a force-transmitting connection to the movable parallel leg by way of a coupling member, and a second lever arm with a force-transmitting connection to a measurement transducer. The force-transmitting mechanism is distinguished by the feature that the second lever arm includes a first partial lever arm and a second partial lever arm, wherein the first partial lever arm is designed to sustain the compensation force generated by the measurement transducer, and the second partial lever arm is designed to serve for the detection of a displacement of the pivotally supported force-transmitting lever relative to a null reference of a position sensor.

Thus, the path of force propagation through which the weight force and the compensation force counterbalance each other does not run through the same lever that also carries the shutter vane. As a result, the function of the position sensor is less affected by a possible bending deformation of the force lever. In addition, in the selection of appropriate dimensions for force-transmitting mechanisms, this solution provides more latitude in the design of the coil carrier and the way in which the latter enters through the mantle into the permanent magnet system. With the use of more powerful measurement transducers, the load range of a force-measuring device can be increased without changing the number of reduction levers or their lengths. It would be more difficult to use software algorithms for the compensation of the increased load-related drift of the measurement result which occurs as a consequence of the more powerful force transducers, because the load drift amplitudes are larger. As a result of the inventive force-transmitting mechanism the amplitudes are reduced, which facilitates compensation by way of a software algorithm.

The term "force-transmitting lever" as used in the present context covers any transmission lever of the force-transmitting mechanism along the path of force propagation from the movable parallel leg to the measurement transducer, irrespective of whether the lever system of the force-transmitting mechanism has one, two or three levers. With preference, among the levers along the path of force propagation of a force-transmitting mechanism, the force-transmitting lever is the one closest to the measurement transducer, i.e. the lever which is directly connected to the measurement transducer without an intermediate transmission lever. In special design variations, the fulcrum of the force-transmitting lever can also be arranged on a preceding lever, which means that the force-transmitting lever has a pivot axis that is movable in relation to the stationary parallel leg. A force-transmitting mechanism of this kind is disclosed for example in EP 1 083 420 B1.

In a further developed concept of the invention, the first partial lever arm and the second partial lever arm are separated lengthwise up to the vicinity of the fulcrum of the pivotally supported force-transmitting lever, so that a compensation force generated by the measurement transducer is transmitted essentially through the first partial lever arm to the movable parallel leg. The advantage of this more advanced concept lies in the simplicity of putting it into practice in the manufacture of this type of force-transmitting mechanisms. In addition, the weakening of the respective parallel-guiding member can be avoided.

In another more advanced concept of the invention, the at least one first partial lever arm and the at least one second partial lever arm are separated lengthwise beyond their lengths and beyond the fulcrum of the pivotally supported force-transmitting lever. Advantageously, this results in a force-transmitting mechanism in which the force-propagation path through which the weight force and the compensation force balance each other is separated from the lever arm of the position sensor over the longest possible distance.

In an advantageous further development, the second lever arm has a divided first partial lever arm which is designed in such a way that the compensation force is transmitted essentially in equal proportions through the divided first partial lever arm to the movable parallel leg. In addition, the second partial lever arm can be arranged between the two branches of the divided first partial lever arm. This arrangement results in a stable, torsion-resistant force-transmitting mechanism which, in addition, can be manufactured easily.

In a first embodiment of the invention, the first partial lever arm and the second partial lever arm are separated from each other in such a way that the two partial lever arms are arranged in separate planes, one above the other and running parallel to the parallel-guiding members. In a second embodiment of the invention, the first partial lever arm and the second partial lever arm are separated from each other in such a way that the two partial lever arms lie side-by-side in the same plane, running parallel to the parallel-guiding members. As a further possibility, the second partial lever in the first or second embodiment can be arranged at an angle w relative to the first partial lever, with the lever fulcrum at the vertex of the angle w.

In another advanced version, a shutter vane is arranged on the second partial lever arm at the far end from the fulcrum of the pivotally supported force-transmitting lever. The shutter vane has an aperture opening, in particular an aperture slot or an elongated hole and a shortest width. Advantageously, the connecting line between the fulcrum of the force-transmitting lever and the center point of the shortest width is essentially perpendicular to the shortest width. In other words, the shortest width of the aperture opening always has the same direction as the tangent of a circle whose center is located in the fulcrum.

In an advantageous embodiment, the stationary parallel leg, the movable parallel leg and the force-transmitting lever are formed together out of one monolithic, homogeneous block of material in which the flexure pivots are configured in the shape of thin material bridges. With preference, the first partial lever arm and/or the second partial lever arm is designed so that at least one of the two partial lever arms can be extended outside the monolithic homogeneous material block.

The force-transmitting mechanism according to the invention can be installed in a force-measuring device that is based on the principle of electromagnetic force compensation, wherein a measurement transducer is arranged at the movable parallel leg of the force-transmitting mechanism to receive the weight force of a weighing load. This measurement transducer includes a permanent magnet system which has an air gap and is arranged on the stationary parallel leg or on a the first lever arm, and a coil which is arranged, in accordance with the permanent magnet system, on the first lever arm or on the stationary parallel leg and is movable in the air gap of the permanent magnet system, with a compensation current flowing through the coil when a measurement operation is taking place. Also arranged on the force-transmitting mechanism is an optoelectronic position sensor with a light source and a light receiver, wherein the light source and the light receiver are arranged on the stationary parallel leg, as well as a shutter vane which shares the movements of the coil and, in the manner of a light gate, traverses the free space between the light emitter and the light receiver. The force-measuring device can be used in a gravimetric measuring instrument.

BRIEF DESCRIPTION OF THE DRAWINGS

In the following, the subject of the invention will be explained by way of examples of preferred embodiments which are illustrated in the attached drawings, wherein:

FIG. 1 shows a schematic sectional representation of a force-measuring device of the state of the art;

FIG. 2 shows a schematic sectional representation of a first embodiment;

FIG. 6 shows a schematic sectional representation of the second embodiment;

FIG. 7 shows a schematic sectional representation of the second embodiment, wherein the second partial lever arm extends outside the basic body of the force-transmitting mechanism;

DETAILED DESCRIPTION

Figure 3A:
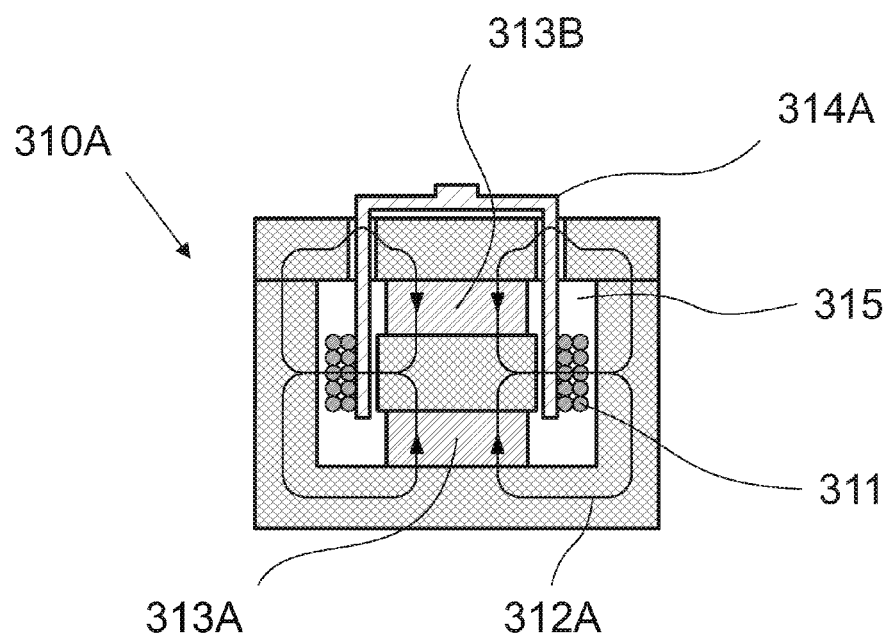
FIG. 3A shows a schematic sectional representation of a measurement transducer with a dual permanent magnet system and axial passage of the coil carrier.

In the following description, features with the same function and similar configuration are identified by the same reference symbols.

FIG. 1 shows a strongly simplified schematic representation of a force-transmitting mechanism 10 with a measurement transducer 110, also referred to as an electrodynamic transducer, and with a position sensor 120 according to the state of the art. Its structure and function are described through the example of a top-loading balance based on the principle of electromagnetic force-compensation. However, this does not exclude other layout arrangements of balances, as long as they work in accordance with the principle of magnetic force compensation.

The weight force of the weighing object (not shown in the drawing) acting on the weighing pan 130 is transferred to the hanger, also referred to as the movable parallel leg 140. The latter is constrained by parallel-guiding members 150 which are connected through elastic flexure elements 165. The coupling member 170, which likewise includes elastic flexure elements, transmits the weight force to the load-receiving arm 181 of the lever 180, which is supported at its center of rotation by at least one flexure pivot 190. The other end of the lever 180, the force-transmitting arm 182, carries the compensation coil 111 of the electrodynamic transducer 110 which is traversed by the magnetic flux 112 that is generated by the permanent magnet 113 of the magnet system.

When a weighing object is placed on the weighing pan 130, the weight force causes the lever 180 to tilt counterclockwise on the flexure fulcrum 190. The displacement of the shutter vane 121 which is attached to the lever 121 is detected by an optoelectronic position sensor 120 and transmitted to an electronic controller (not shown) which, in response, increases the compensation current flowing through the compensation coil 111 up to the point where the lever 180 has returned to the original equilibrium position. As the weight force is proportional to the compensation force in accordance with the reduction ratio of the lever 180, and as the compensation force, in turn, is proportional to the compensation current, the latter is also proportional to the weight force and thus to the applied load.

An analog/digital converter (not shown) converts the analog compensation current into a digital quantity, so that a digital equivalent of the measured quantity is made available to the signal-processing unit. As the magnetic flux is temperature-dependent, the temperature is measured by a temperature sensor whose signal is likewise available to the signal-processing unit. The latter now applies a compensation for the drift of the measurement signal that is caused by a temperature change. In addition and among other mathematical procedures, the measurement signal is linearized, expressed in units of mass and finally presented on a display (not shown) or transmitted by way of an interface (not shown) to an external display device.

The measurement transducer 110 preferably includes a permanent magnet system 113 with an air gap 115, and a coil 111 that is attached to a coil carrier 114 and moves together with the latter in the air gap 115 of the permanent magnet system 113. However, there are also other measurement transducers that could be used, which are of the type in which a compensation force is generated. The position sensor 120, likewise, is preferably an optoelectronic position sensor, but other position sensors are also possible in which a displacement of the interconnected movable parts of the balance from a null position is detected. An optoelectronic position sensor includes a light source and a light receiver, wherein the light source and the light receiver are arranged on the stationary parallel leg 145 facing each other across a free space, and further includes a shutter vane 121 which participates in the movement of the coil 111 and which, in the manner of a light gate, traverses the free space between the light emitter and light receiver.

In the arrangement of FIG. 1, the compensation force generated by the measurement transducer 110 is transmitted by way of the force-transmitting arm 182, the load-receiving arm 181, and the coupling member 170 to the movable parallel leg 140 in order to counteract the weight force of a weighing object that has been placed on the weighing pan 130. This force propagation has a mechanical effect on the components involved in it. For example, the force-transmitting lever 180 will bend under the load and thus be deformed into an arcuate shape, so that the points of application of the load and the counterforce on the force-transmitting lever 180 and the fulcrum point 190 are no longer in alignment with each other. This also affects the shutter vane 121 which is likewise attached to the force-transmitting lever 180, as the deformation of the force-transmitting lever 180 represents a deviation from the ideal case of a straight, non-sagging lever and thus introduces an error into the weight measurement.

As a countermeasure against this drawback, the force-transmitting lever 180 can be made stronger through a more robust design. However, this increases the mass of the movable parts, i.e. the force-transmitting lever 180, the coil carrier 114 and the coil 111, which leads to a greater inertia and thus in the end to a longer transient time before the measurement value of the weight can be reliably determined and presented on the display. Accordingly, the development efforts until now have been focused on finding an optimal balance between structural strength and material weight of the force-transmitting lever 180.

The force-measuring device 200 shown in FIG. 2 is identical to the force-measuring device 10 of FIG. 1 in all of the aforementioned components except the force-transmitting lever 280. The load-receiving arm 181 of the force-transmitting lever 280, extending from the flexure pivot 164 of the coupling member 170 to the flexure-pivoted support fulcrum 190 is likewise configured identically as in FIG. 1, but the other lever arm, the force-transmitting lever arm 282, is divided into a first partial lever arm 282A and a second partial lever arm 282B. The second partial lever arm 282B, which is shown in the upper position in FIG. 2, is connected to the position sensor vane 121. Connected to the first partial lever arm 282A is the coil carrier 114. The split extends over the entire length of the force-transmitting lever arm 282 up to the fulcrum point at the flexure pivot 190, but depending on the design of the force-measuring device, the split can also extend beyond the flexure pivot 190 or terminate short of the flexure pivot 190.

The force propagation path through which the weight force and the compensation force counteract each other no longer runs through the same lever that also carries the shutter vane. This reduces the extent to which a possible bending deformation of the force-transmitting lever can affect the position-detecting function of the shutter vane. In addition, in the selection of an appropriate layout for a force-transmitting mechanism, this solution provides more design freedom in the dimensioning of the coil carrier and the way in which the latter enters through the mantle into the permanent magnet system.

A further aspect to be considered in the design of the force-transmitting lever 180 is the attachment of the coil carrier 114 and its passage through the mantle to the inside of the measurement transducer. FIGS. 1 and 2 illustrate measurement transducers 110 with one permanent magnet 113. In a further developed embodiment shown in FIGS. 3A and 3B, the measurement transducers 310A, 310B each have two permanent magnets with a pole piece arranged between them. Measurement transducers with two permanent magnets have in most cases a more precisely defined geometry of the magnetic flux 312A, 312B, meaning that the field lines in the vicinity of the coil 311 are more densely concentrated and better aligned in the direction perpendicular to the coil axis, more specifically the center axis of the coil windings. A disturbance of the field lines has a detrimental effect on the performance data of the measurement transducer and in the end also on the performance of the instrument in general.

FIG. 3A shows a measurement transducer 310A with two permanent magnets 313A, 313B, wherein the coil carrier 314A enters into the mantle from the top. Due to the openings in the mantle, the field lines 312a in the upper part are disturbed and therefore not the exact mirror image of the field lines in the lower part. The magnetic field that establishes itself is non-uniform in the movement direction of the coil 311.

Figure 3B:
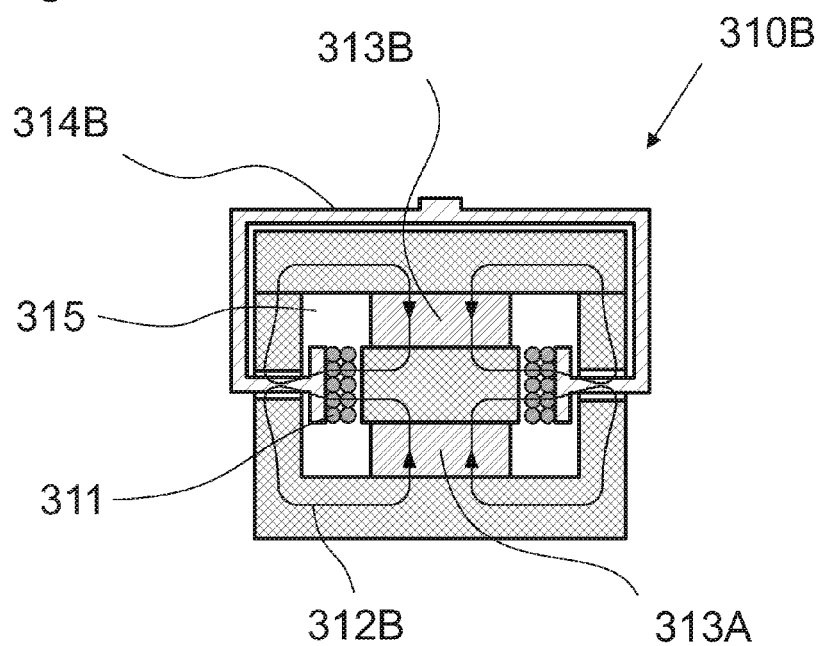
FIG. 3B shows a schematic sectional representation of a measurement transducer with a dual permanent magnet system and radial passage of the coil carrier.

The measurement transducer 310B shown in FIG. 3B is identical to the transducer 310A in FIG. 3A, except that the coil carrier 314B is introduced into the mantel from the side. This results in a uniform, symmetrical propagation of the field lines 312B. In the area of the passage opening for the coil carrier 314B, the field lines 312B deviate towards the outside of the measurement transducer 310B, which makes the magnet system more susceptible to interference from extraneous fields. This is a less advantageous design, as the magnetic field lines are disturbed at the height of a connecting line from the pole piece through the coil 311 to the mantle.

In a further embodiment of a measurement transducer which is not illustrated in the drawings, the coil carrier is introduced through the mantle from the side in the area of the upper permanent magnet. Thus, the displacement movement of the coil is directed parallel to the magnetic field lines, whereby the disturbance is minimized. Although the respective field lines of the upper and the lower permanent magnets are still slightly asymmetric, this hardly causes any disturbance.

However, as a general rule, the smaller the passage opening through the mantle can be designed, the better the instrument will perform in the end result.

Figure 4:
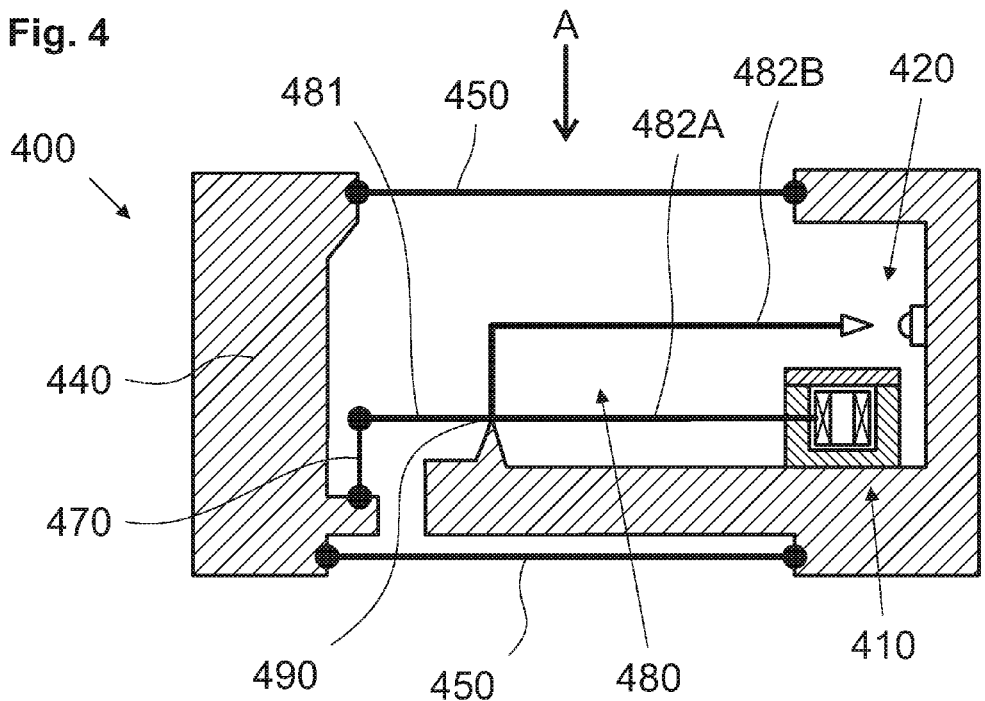
FIG. 4 represents a simplified schematic view of the first embodiment.

A first embodiment of the invention is shown in a schematically simplified representation in FIG. 4. The force-transmitting lever 480 is pivotally supported at the fulcrum 490 and has a second lever arm, also referred to as force-transmitting arm, which is divided into a first partial lever arm 482A and a second partial lever arm 482B. In relation to the fulcrum 490, the force transducer 410 is arranged in the area of the far end of the first partial lever arm 482A, while the position sensor 420 (likewise drawn schematically) is arranged at the far end of the second partial lever 482B. The two partial lever arms 482A and 482B are arranged one above the other in different planes parallel to the parallel-guiding members, meaning that the two partial lever arms are located at different distances from the plane of one of the parallel-guiding members.

Figure 5:
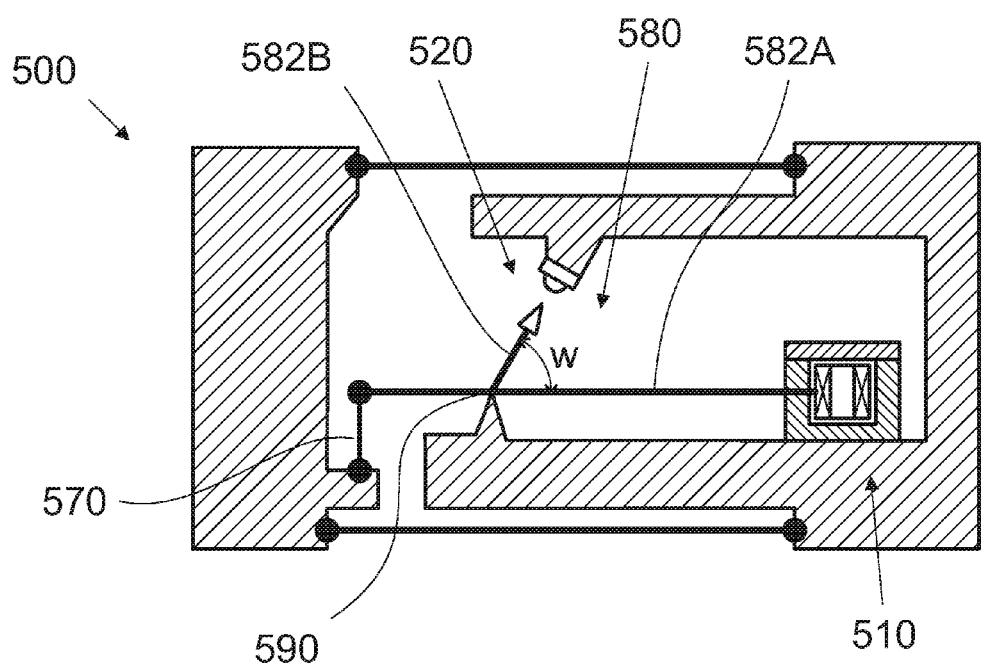
FIG. 5 represents a simplified schematic view of the first embodiment or of a second embodiment.

In a further embodiment shown in FIG. 5, the second partial lever arm 582B is turned away from the first partial lever arm 582 by an angle w, with the supporting pivot 590, also referred to as fulcrum, forming the vertex of the angle. The range of possibilities also includes an angle of 180°, in which case the first partial lever arm 582A and the second partial lever arm 582B would be oriented in opposite directions.

The second partial lever arm 582B, at the far end from the fulcrum 590 of the pivotally supported force-transmitting lever 580, carries a shutter vane (indicated symbolically by an arrowhead) which includes an aperture opening, in particular an aperture slot or an elongated hole with a shortest width. The shutter vane cuts in such a way through the light that is emitted by the light source that a part of the light beam passing through the shortest width falls on the light receiver. In the configuration with the second partial lever arm 582B set at an angle, in order for the shutter vane to be positioned optimally to cut through the light, the connecting line between the fulcrum 590 of the force-transmitting lever 580 and the center point of the shortest width is essentially perpendicular to the shortest width. In other words, the shortest width of the aperture opening always has the same direction as the tangent of a circle whose center is located in the fulcrum 590 and whose circumference includes the midpoint of the shortest width.

FIGS. 6 and 7 each show a force-transmitting mechanism 600, 700 as seen in the viewing direction A that is indicated in FIG. 4. In contrast to the force-transmitting mechanism 400 of FIG. 4, the force-transmitting mechanism 600 in FIG. 6 has a first partial lever arm 682A and a second partial lever arm 682B lying in the same plane which runs parallel to the parallel-guiding members, wherein the first and the second partial lever arm are arranged side-by-side, so that they are at the same distance from the plane of one of the parallel-guiding members.

As shown further in FIG. 7, the second partial lever arm 782B can also be arranged outside the confines of the basic body of the force-transmitting mechanism 700, for example in the form of an attached lever extension. The attached lever extension can also be used for the measurement transducer.

Figure 8:
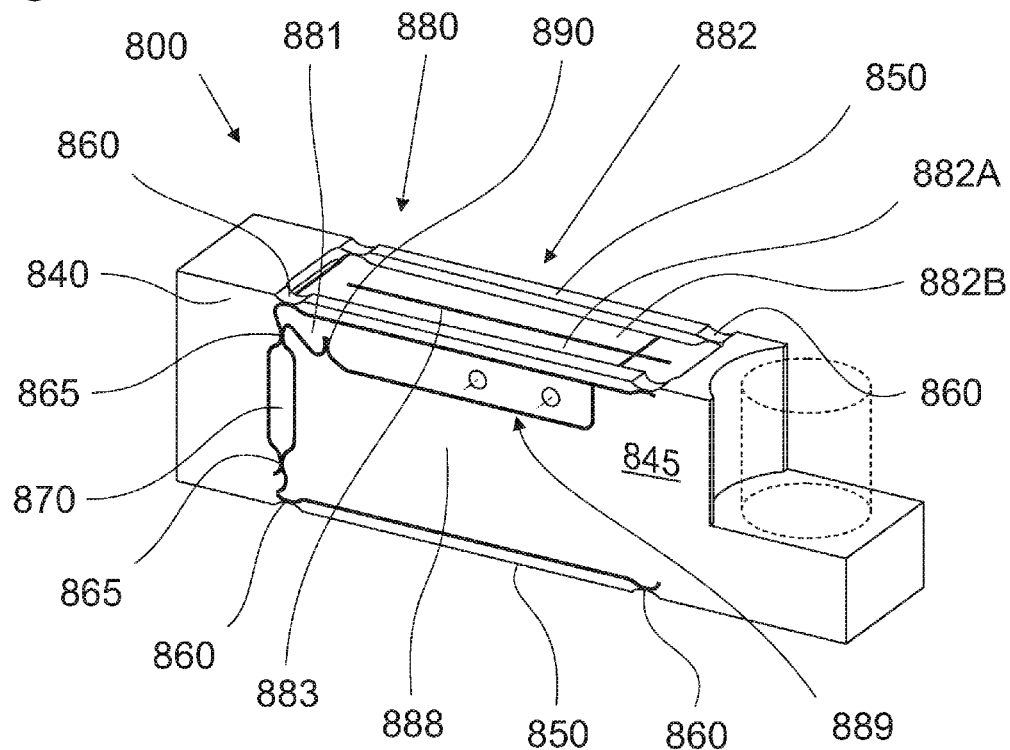
FIG. 8 shows a monolithically constructed force-transmitting mechanism of the second embodiment in an isometric drawing.

The force-transmitting mechanism 800 is shown in FIG. 8 as a monolithically formed structure, i.e. made out of one material block. The weight force of the weighing object (not shown in the drawing) is transmitted to the hanger, also referred to as the movable parallel leg 840. The latter is constrained by parallel-guiding members 850 which are connected through elastic flexure elements 860. The coupling member 870, which likewise includes elastic flexure elements 865, transmits the weight force to the load arm 881 of the lever 880, which is supported at its center of rotation by at least one flexure fulcrum 890. The other end of the lever 880, the force-transmitting arm 882, carries the compensation coil of the electrodynamic transducer, also referred to as measurement transducer, which is traversed by the magnetic flux that is generated by the permanent magnet of the magnet system. In FIG. 8, the measurement transducer is drawn symbolically as a space holder with the dotted outline of a cylinder.

A separating cut 883 in a plane that extends parallel to the side surfaces 888 splits the second lever arm 882 into two partial lever arms 882A, 882B. This kind of separating cut 883 can be produced for example by milling, if the cut is not designed to pass through the entire material block. Otherwise, the separating cut 883 can also be produced by electrical discharge machining.

The side surface 888 of the first partial lever arm 882A has two holes 889 which serve for the attachment of a lever extension. The lever extension can bridge the distance between the first partial lever arm and the coil which is arranged inside the permanent magnet system that is supported by the stationary parallel leg.

Figure 9:
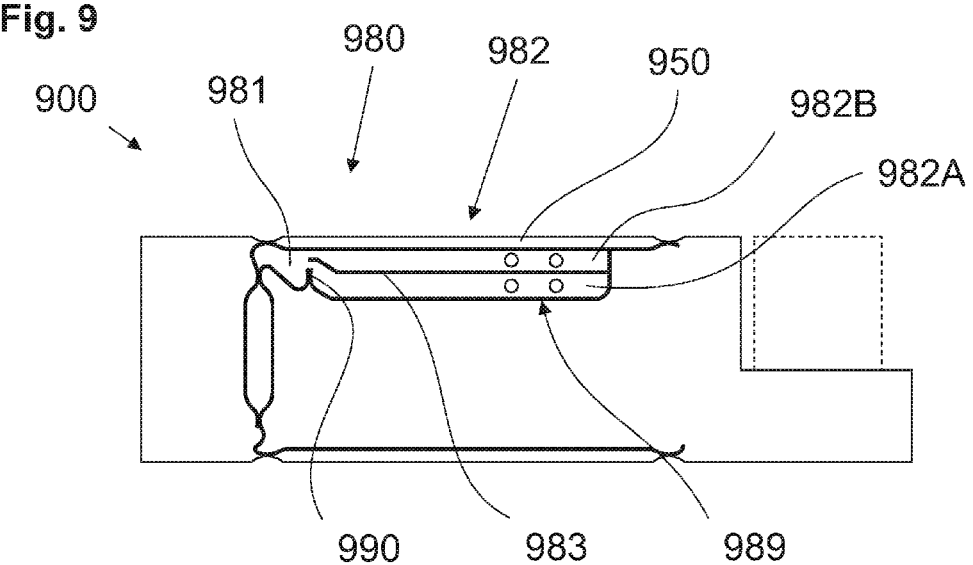
FIG. 9 shows a monolithically constructed force-transmitting mechanism of the first embodiment in a side elevation drawing.

The separating cut 983 in FIG. 9 splits the second lever arm 982 in a plane that extends parallel to the parallel-guiding member 950 into two partial lever arms 982A, 982B. This kind of separating cut 983 can be produced for example by electrical discharge machining. Each of the two partial lever arms 982A, 982B has two holes 989 which serve for the attachment of lever extensions.

Figure 10:
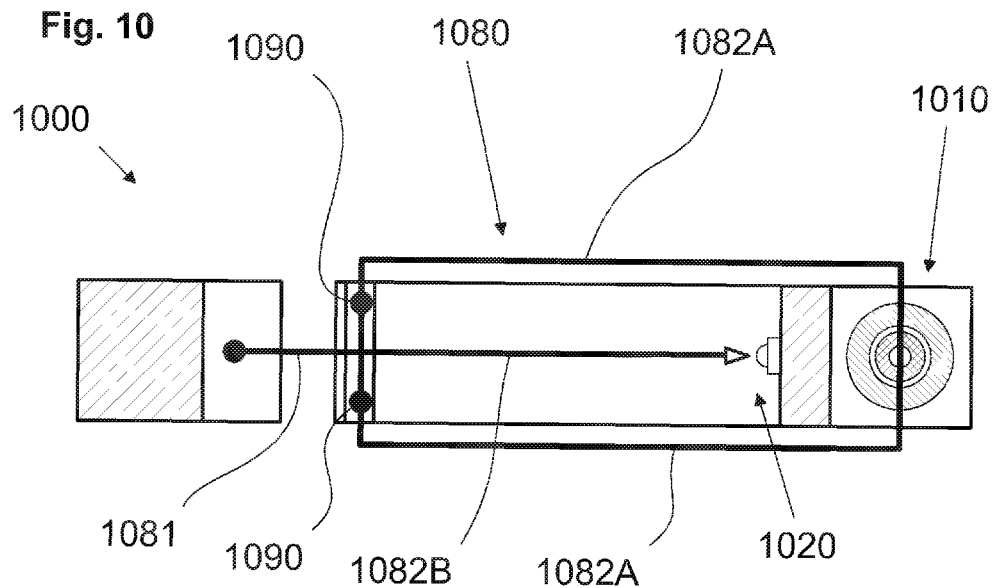
FIG. 10 shows a schematic sectional representation of the second embodiment, wherein the second partial lever arm extends outside the basic body of the force-transmitting mechanism.
Figure 11:
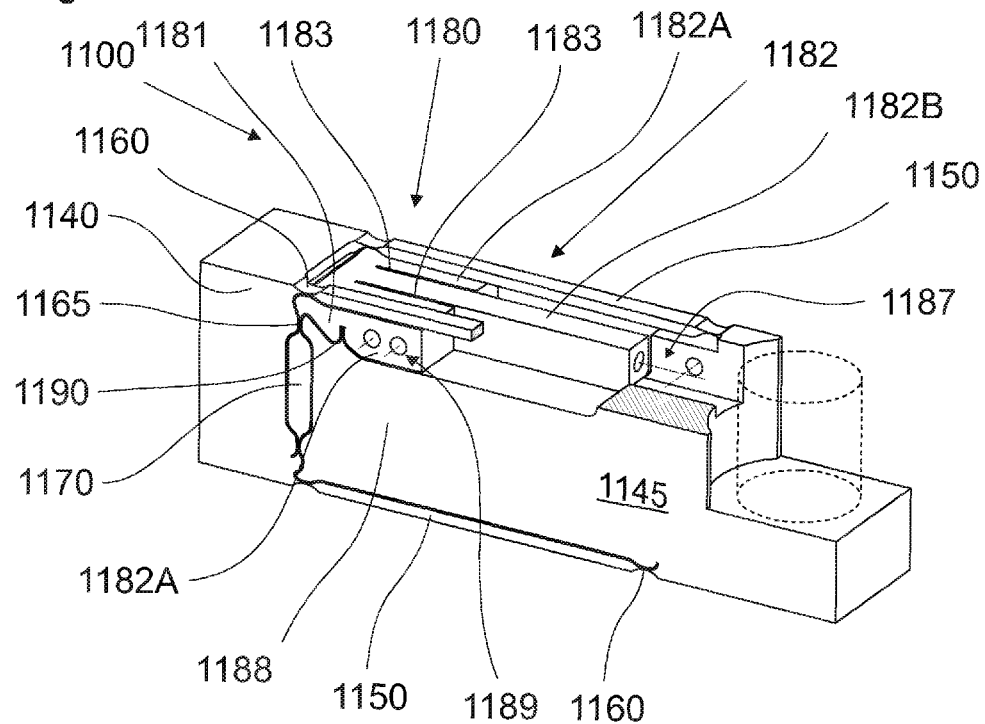
FIG. 11 shows a monolithically constructed force-transmitting mechanism of the third embodiment in an isometric drawing.

FIGS. 10 and 11 illustrate a third embodiment, a force-transmitting mechanism 1000 as seen in the viewing direction A that is indicated in FIG. 4. In contrast to the force-transmitting mechanisms of FIGS. 6 and 7, the first partial lever arm 1082A of the force-transmitting mechanism 1000 is divided into two parts which are arranged outside of the basic body of the force-transmitting mechanism 1000 and extend to the measurement transducer 1010. The second partial lever arm 1082B lies between the two branches of the divided first partial lever arm 1082A and is arranged side-by side in the same plane together with the latter, extending parallel to the parallel-guiding member 1150, so that the two partial lever arms 1082A, 1082B are at the same distance from the plane of one of the parallel-guiding members 1150.

FIG. 11 illustrates a force-transmitting mechanism 1100 that is monolithically formed, i.e. constructed of a single material block and has the same configuration as the force-transmitting mechanism 1000 described above in the context of FIG. 10. In its function, this force-transmitting mechanism is analogous to the force-transmitting mechanism of FIG. 8. The measurement transducer is likewise represented by a place holder in the dotted outlines of a cylinder. Compared to the force-transmitting mechanism 800 of FIG. 8, the force-transmitting mechanism 1100 is distinguished by having two separating cuts 1183. Thus, three partial lever arms are created, wherein the two partial lever arms 1182A that lie on the outside can carry extensions that are attached to the fastening connections 1189 and lead to the measurement transducer. Thus, the first partial lever arm can be looked at as a divided first partial lever arm. The cut-away portion opens up the view to the second partial lever arm 1182B. The latter has at its far end from the flexure fulcrum 1190 a fastening connector for a shutter vane which participates in the movements of the coil and which, in the manner of a light gate, traverses the free space between the light emitter and the light receiver of a position sensor. The fastening arrangement 1187 for the position sensor just mentioned and for the shutter vane is indicated in FIG. 11 as a bore hole. In order to simplify the manufacturing process of a force-transmitting mechanism 1100, the separating cuts 1183 can be left out. The second partial lever arm 1182B is defined by milled gaps on both sides which separate the first partial lever arm 1182A from the second partial lever arm 1182B. As described above, the first partial lever arm 1182 can reach to the measurement transducer by means of a lever extension which runs outside the confines of the force-transmitting mechanism 1100. By omitting the separating cuts 1183, the upper parallel-guiding member is not weakened or divided.

What is claimed is:

1. A mechanism for transmitting force in a force-measuring device based on the principle of electromagnetic force compensation, the mechanism comprising:
    a parallel-motion guide mechanism with a movable parallel leg, a stationary parallel leg, and at least two parallel-guiding members;
    flexure pivots that connect the parallel legs and the parallel-guiding members to each other, with the movable parallel leg constrained to the stationary parallel leg in guided mobility by the parallel-guiding members;
    a force-transmitting lever that is pivotally supported on a fulcrum pivot arranged on the stationary parallel leg with a first lever arm having a force-transmitting connection to the movable parallel leg by way of a coupling member, and a second lever arm to which a measurement transducer can be attached through a force-transmitting connection;
    wherein the second lever arm comprises a first partial lever arm and a second partial lever arm, the respective partial lever arms being separated from each other over a lengthwise extension thereof, up to a vicinity of the fulcrum pivot, such that the first partial lever arm receives the compensation force generated by the measurement transducer and transmits the compensation force to the movable parallel leg, and the second partial lever arm detects a displacement of the pivotally supported force-transmitting lever from a null reference of a position sensor.

2. A force-measuring device based on the principle of electromagnetic force compensation, comprising:
    a mechanism for transmitting force according to claim 1;
    a measurement transducer, arranged between the first partial lever arm of the mechanism and the stationary parallel leg of the mechanism to receive the weight force of a load being weighed, the measurement transducer comprising:
        a permanent magnet system with an air gap, arranged on either the stationary parallel leg or the first partial lever arm; and
        a coil, attached in accordance with the permanent magnet system to either the first partial lever arm or to the stationary parallel leg, to be movable in the air gap of the permanent magnet system, with a compensation current flowing through the coil when a measurement operation is taking place;
    an optoelectronic position sensor, comprising:
        a light source; and
        a light receiver, wherein the light source and the light receiver are arranged on the stationary parallel leg with a free space between them; and
    a shutter vane, arranged on the second partial lever arm to participate in the movements of the coil, traversing the free space between the light emitter and the light receiver in the manner of a light gate.

3. The mechanism of claim 1, wherein the first partial lever arm and the second partial lever arm are separated from each other over a lengthwise extension thereof, beyond the fulcrum pivot.

4. The mechanism of claim 3, wherein the first partial lever arm of the second lever arm is divided into branches that transmit the compensation force in essentially equal shares therethrough to the movable parallel leg.

5. The mechanism of claim 4, wherein the second partial lever arm is arranged between the branches of the divided first partial lever arm.

6. The mechanism of claim 1, wherein the first partial lever arm and the second partial lever arm are separated from each other such that the respective partial lever arms lie one above the other in separate planes that extend parallel to the parallel-guiding members.

7. The mechanism of claim 6, wherein the second partial lever arm is arranged at an angle to the first partial lever arm, with a vertex of the angle lying in the fulcrum pivot.

8. The mechanism of claim 1, wherein the first partial lever arm and the second partial lever arm are separated from each other such that the respective partial lever arms lie side-by-side in a common plane which extends parallel to the parallel-guiding members.

9. The mechanism of claim 8, wherein the second partial lever arm is arranged at an angle to the first partial lever arm, with a vertex of the angle lying in the fulcrum pivot.

10. The mechanism of claim 1, further comprising:
    a shutter vane, arranged on the second partial lever arm at the end thereof farther from the fulcrum pivot.

11. The mechanism of claim 10, wherein the shutter vane has an aperture opening, in particular an aperture slot or an elongated hole with a shortest width.

12. The mechanism of claim 11, wherein a connecting line between the fulcrum pivot and the midpoint of the shortest width is essentially perpendicular to the shortest width.

13. The mechanism of claim 1, wherein the stationary parallel leg, the movable parallel leg and the force-transmitting lever are made in one piece out of a monolithic, homogeneous material block and the flexure pivots are formed in the shape of thin material bridges.

14. The mechanism of claim 13, wherein at least one of the first and second partial lever arms is designed such that at least one of the first and second partial lever arms can extend outside of the monolithic, homogeneous material block.

15. The mechanism of claim 1, wherein the first partial lever arm of the second lever arm is divided into branches that transmit the compensation force in essentially equal shares therethrough to the movable parallel leg.

16. The mechanism of claim 15, wherein the second partial lever arm is arranged between the branches of the divided first partial lever arm.

17. The mechanism of claim 1, wherein the first partial lever arm of the second lever arm is divided into branches that transmit the compensation force in essentially equal shares therethrough to the movable parallel leg.

18. The mechanism of claim 17, wherein the second partial lever arm is arranged between the branches of the divided first partial lever arm.

19. A gravimetric measuring instrument comprising a force-measuring device according to claim 2.

* * * * *